(12) United States Patent
Chambers

(10) Patent No.: US 6,233,106 B1
(45) Date of Patent: May 15, 2001

(54) METHOD OF IDENTIFYING A LOCATION ON A RECORDING MEDIUM ENCODED WITH LOCAL SUBTRACK IDENTIFIERS

(75) Inventor: Barbara L. Chambers, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,300

(22) Filed: Dec. 29, 1999

Related U.S. Application Data

(62) Division of application No. 08/828,984, filed on Mar. 31, 1997.

(51) Int. Cl.[7] .................................................. G11B 5/09
(52) U.S. Cl. ........................ 360/48; 360/49; 360/77.08; 360/78.14
(58) Field of Search ................................. 360/48, 77.08, 360/49, 78.14, 72.1, 72.2

(56) References Cited

U.S. PATENT DOCUMENTS

| 5,452,284 | | 9/1995 | Miyagawa et al. |
| 5,596,460 | * | 1/1997 | Greenberg et al. ............... 360/78.14 |
| 5,638,229 | | 6/1997 | Shingu et al. |
| 5,828,508 | * | 10/1998 | Whaley et al. .......................... 360/49 |
| 6,075,667 | * | 6/2000 | Kisaka et al. ........................... 360/49 |

* cited by examiner

*Primary Examiner*—David Hudspeth
*Assistant Examiner*—Dan I. Davidson
(74) *Attorney, Agent, or Firm*—Derek J. Berger; Jonathan E. Olson; Shawn B. Dempster

(57) ABSTRACT

A method of determining the subtrack within zone P on a recording medium is provided. The recording medium has a plurality of zones 1 through Q. Each zone has a plurality of subtracks 0 through M. Each subtrack has a plurality of sectors 0 through N. Each sector has a position identifier field. Each position identifier field has a plurality of information units for recording a position identifier. The position identifier for Jth sector of subtrack I is identified as S(I,J). A preferred method comprises obtaining the local subtrack value as S(I,0), a space-efficient way to store and extract subtrack location information.

5 Claims, 5 Drawing Sheets

Q = NUMBER OF ZONES = 4, PRIME NUMBER = 5

| TRACK | ZONE P | SUBTRACK M | SECTOR N = 0 | | SECTOR N = 1 | | SECTOR N = 2 | | SECTOR N = 3 | | SECTOR N = 4 | |
|---|---|---|---|---|---|---|---|---|---|---|---|---|
| | | | VALUE | Position Identifier | VALUE | Position Identifier | VALUE | Position Identifier | VALUE | Position Identifier | VALUE | Position Identifier |
| 0 | 1 | 0 | 0 | 000 | 1 | 001 | 2 | 011 | 3 | 010 | 4 | 110 |
| 1 | 1 | 1 | 1 | 001 | 2 | 011 | 3 | 010 | 4 | 110 | 0 | 000 |
| 2 | 1 | 2 | 2 | 011 | 3 | 010 | 4 | 110 | 0 | 000 | 1 | 001 |
| 3 | 1 | 3 | 3 | 010 | 4 | 110 | 0 | 000 | 1 | 001 | 2 | 011 |
| 4 | 1 | 4 | 4 | 110 | 0 | 000 | 1 | 001 | 2 | 010 | 3 | 010 |
| 5 | 2 | 0 | 0 | 000 | 2 | 011 | 4 | 110 | 1 | 001 | 3 | 010 |
| 6 | 2 | 1 | 1 | 001 | 3 | 010 | 0 | 000 | 2 | 011 | 4 | 110 |
| 7 | 2 | 2 | 2 | 011 | 4 | 110 | 1 | 001 | 3 | 010 | 0 | 000 |
| 8 | 2 | 3 | 3 | 010 | 0 | 000 | 2 | 011 | 4 | 110 | 1 | 001 |
| 9 | 2 | 4 | 4 | 110 | 1 | 001 | 3 | 010 | 0 | 000 | 2 | 011 |
| 10 | 3 | 0 | 0 | 000 | 3 | 010 | 1 | 001 | 4 | 110 | 2 | 011 |
| 11 | 3 | 1 | 1 | 001 | 4 | 110 | 2 | 011 | 0 | 000 | 3 | 010 |
| 12 | 3 | 2 | 2 | 011 | 0 | 000 | 3 | 010 | 1 | 001 | 4 | 110 |
| 13 | 3 | 3 | 3 | 010 | 1 | 001 | 4 | 110 | 2 | 011 | 0 | 000 |
| 14 | 3 | 4 | 4 | 110 | 2 | 011 | 0 | 000 | 3 | 010 | 1 | 001 |
| 15 | 4 | 0 | 0 | 000 | 4 | 110 | 3 | 010 | 2 | 011 | 1 | 001 |
| 16 | 4 | 1 | 1 | 001 | 0 | 000 | 4 | 110 | 3 | 010 | 2 | 011 |
| 17 | 4 | 2 | 2 | 011 | 1 | 001 | 0 | 000 | 4 | 110 | 3 | 010 |
| 18 | 4 | 3 | 3 | 010 | 2 | 011 | 1 | 001 | 0 | 000 | 4 | 110 |
| 19 | 4 | 4 | 4 | 110 | 3 | 010 | 2 | 011 | 1 | 001 | 0 | 000 |

FIG. 1
( PRIOR ART )

Q = NUMBER OF ZONES = 4

| TRACK | ZONE P | SUBTRACK M | VALUE OF POSITION IDENTIFIER | POSITION IDENTIFIER IN GRAY CODE |
|---|---|---|---|---|
| 0  | 1 | 0 | 0  | 00000 |
| 1  | 1 | 1 | 1  | 00001 |
| 2  | 1 | 2 | 2  | 00011 |
| 3  | 1 | 3 | 3  | 00010 |
| 4  | 1 | 4 | 4  | 00110 |
| 5  | 2 | 0 | 5  | 00111 |
| 6  | 2 | 1 | 6  | 00101 |
| 7  | 2 | 2 | 7  | 00100 |
| 8  | 2 | 3 | 8  | 01100 |
| 9  | 2 | 4 | 9  | 01101 |
| 10 | 3 | 0 | 10 | 01111 |
| 11 | 3 | 1 | 11 | 01110 |
| 12 | 3 | 2 | 12 | 01010 |
| 13 | 3 | 3 | 13 | 01011 |
| 14 | 3 | 4 | 14 | 01001 |
| 15 | 4 | 0 | 15 | 01000 |
| 16 | 4 | 1 | 16 | 11000 |
| 17 | 4 | 2 | 17 | 11001 |
| 18 | 4 | 3 | 18 | 11011 |
| 19 | 4 | 4 | 19 | 11010 |

FIG. 5

Q = NUMBER OF ZONES = 4, PRIME NUMBER = 5

| TRACK | ZONE P | SUBTRACK M | SECTOR N = 0 VALUE | SECTOR N = 0 Position Identifier | SECTOR N = 1 VALUE | SECTOR N = 1 Position Identifier | SECTOR N = 2 VALUE | SECTOR N = 2 Position Identifier | SECTOR N = 3 VALUE | SECTOR N = 3 Position Identifier | SECTOR N = 4 VALUE | SECTOR N = 4 Position Identifier |
|---|---|---|---|---|---|---|---|---|---|---|---|---|
| 0 | 1 | 0 | 0 | 000 | 1 | 001 | 2 | 011 | 3 | 010 | 4 | 110 |
| 1 | 1 | 1 | 1 | 001 | 2 | 011 | 3 | 010 | 4 | 110 | 0 | 000 |
| 2 | 1 | 2 | 2 | 011 | 3 | 010 | 4 | 110 | 0 | 000 | 1 | 001 |
| 3 | 1 | 3 | 3 | 010 | 4 | 110 | 0 | 000 | 1 | 001 | 2 | 011 |
| 4 | 1 | 4 | 4 | 110 | 0 | 000 | 1 | 001 | 2 | 011 | 3 | 010 |
| 5 | 2 | 0 | 0 | 000 | 2 | 011 | 4 | 110 | 1 | 001 | 3 | 010 |
| 6 | 2 | 1 | 1 | 001 | 3 | 010 | 0 | 000 | 2 | 011 | 4 | 110 |
| 7 | 2 | 2 | 2 | 011 | 4 | 110 | 1 | 001 | 3 | 010 | 0 | 000 |
| 8 | 2 | 3 | 3 | 010 | 0 | 000 | 2 | 011 | 4 | 110 | 1 | 001 |
| 9 | 2 | 4 | 4 | 110 | 1 | 001 | 3 | 010 | 0 | 000 | 2 | 011 |
| 10 | 3 | 0 | 0 | 000 | 3 | 010 | 1 | 001 | 4 | 110 | 2 | 011 |
| 11 | 3 | 1 | 1 | 001 | 4 | 110 | 2 | 011 | 0 | 000 | 3 | 010 |
| 12 | 3 | 2 | 2 | 011 | 0 | 000 | 3 | 010 | 1 | 001 | 4 | 110 |
| 13 | 3 | 3 | 3 | 010 | 1 | 001 | 4 | 110 | 2 | 011 | 0 | 000 |
| 14 | 3 | 4 | 4 | 110 | 2 | 011 | 0 | 000 | 3 | 010 | 1 | 001 |
| 15 | 4 | 0 | 0 | 000 | 4 | 110 | 3 | 010 | 2 | 011 | 1 | 001 |
| 16 | 4 | 1 | 1 | 001 | 0 | 000 | 4 | 110 | 3 | 010 | 2 | 011 |
| 17 | 4 | 2 | 2 | 011 | 1 | 001 | 0 | 000 | 4 | 110 | 3 | 010 |
| 18 | 4 | 3 | 3 | 010 | 2 | 011 | 1 | 001 | 0 | 000 | 4 | 110 |
| 19 | 4 | 4 | 4 | 110 | 3 | 010 | 2 | 011 | 1 | 001 | 0 | 000 |

FIG. 6

Q = NUMBER OF ZONES = 4, PRIME NUMBER = 5

| TRACK | ZONE P | SUBTRACK M | SECTOR N = 0 VALUE | SECTOR N = 0 Position Identifier | SECTOR N = 1 VALUE | SECTOR N = 1 Position Identifier | SECTOR N = 2 VALUE | SECTOR N = 2 Position Identifier | SECTOR N = 3 VALUE | SECTOR N = 3 Position Identifier | SKIPPED VALUE |
|---|---|---|---|---|---|---|---|---|---|---|---|
| 0 | 1 | 0 | 0 | 000 | 1 | 001 | 2 | 011 | 3 | 010 | 4 |
| 1 | 1 | 1 | 1 | 001 | 2 | 011 | 3 | 010 | 4 | 110 | 0 |
| 2 | 1 | 2 | 2 | 011 | 3 | 010 | 4 | 110 | 0 | 000 | 1 |
| 3 | 1 | 3 | 3 | 010 | 4 | 110 | 0 | 000 | 1 | 001 | 2 |
| 4 | 1 | 4 | 4 | 110 | 0 | 000 | 1 | 001 | 2 | 011 | 3 |
| 5 | 2 | 0 | 0 | 000 | 2 | 011 | 4 | 110 | 1 | 001 | 3 |
| 6 | 2 | 1 | 1 | 001 | 3 | 010 | 0 | 000 | 2 | 011 | 4 |
| 7 | 2 | 2 | 2 | 011 | 4 | 110 | 1 | 001 | 3 | 010 | 0 |
| 8 | 2 | 3 | 3 | 010 | 0 | 000 | 2 | 011 | 4 | 110 | 1 |
| 9 | 2 | 4 | 4 | 110 | 1 | 001 | 3 | 010 | 0 | 000 | 2 |
| 10 | 3 | 0 | 0 | 000 | 3 | 010 | 1 | 001 | 4 | 110 | 2 |
| 11 | 3 | 1 | 1 | 001 | 4 | 110 | 2 | 011 | 0 | 000 | 3 |
| 12 | 3 | 2 | 2 | 011 | 0 | 000 | 3 | 010 | 1 | 001 | 4 |
| 13 | 3 | 3 | 3 | 010 | 1 | 001 | 4 | 110 | 2 | 011 | 0 |
| 14 | 3 | 4 | 4 | 110 | 2 | 011 | 0 | 000 | 3 | 010 | 1 |
| 15 | 4 | 0 | 0 | 000 | 4 | 110 | 3 | 010 | 2 | 011 | 1 |
| 16 | 4 | 1 | 1 | 001 | 0 | 000 | 4 | 110 | 3 | 010 | 2 |
| 17 | 4 | 2 | 2 | 011 | 1 | 001 | 0 | 000 | 4 | 110 | 3 |
| 18 | 4 | 3 | 3 | 010 | 2 | 011 | 1 | 001 | 0 | 000 | 4 |
| 19 | 4 | 4 | 4 | 110 | 3 | 010 | 2 | 011 | 1 | 001 | 0 |

METHOD OF IDENTIFYING A LOCATION ON A RECORDING MEDIUM ENCODED WITH LOCAL SUBTRACK IDENTIFIERS

REFERENCE TO CO-PENDING APPLICATION

The present application is a divisional application of co-pending U.S. patent application Ser. No. 08/828,984, filed Mar. 31, 1997 entitled "APPARATUS AND METHOD TO ENCODE POSITION INFORMATION DATA ON RECORDING MEDIUM".

BACKGROUND OF THE INVENTION

1. Field of Invention

The present invention relates generally to apparatus and method to encode and decode position information on a recording medium and more particularly, but not by way of limitation to improvements in encoding and decoding position information on a recording medium for use with rotating disc magnetic data storage devices.

2. Brief Description of the Prior Art

In rotating disc magnetic data storage devices, data is stored in sectors extending angularly along concentric data tracks defined on the discs of the device. The discs have magnetizable surface coatings. Data is written and subsequently read by transducer heads that fly over the surfaces of the disks to magnetize cells of the surface coatings, for writing, or respond to differences in magnetization of adjacent cells for reading. Both operations are controlled by a read/write controller that provides encoded data to the transducer head during writing and receives pulses from the transducer heads during readback of the data.

Further, the data is written on the discs either at constant frequency, with a single zone of recorded data or at variable frequency with multiple zones of recorded data. Each zone will have multiple subtracks. The subtracks further have multiple sectors. Thus, in order to read data from a sector or write data to a sector, there is a need to locate and identify a sector. Thus, there is a need to determine various position determining information like the subtrack number, zone number and the sector number. Typically, this is accomplished by first writing a position information data field in every sector and subsequently reading the information during a positioning operation. The position information data field typically contains a Fill field, an Automatic Gain field, an Index field, a Position Identifier field and a Servo Burst field. The Position Identifier field contains a position identifier, typically a global subtrack number encoded in Gray Code. The subtrack number is a unique number identifying a specific subtrack in a specific zone. The index field contains an index mark bit. The index mark bit in the first sector will be different than the index mark bit in all other sectors. Thus, the orientation of the transducer with respect to the disc surface includes first establishing the angular position then locking an oscillator with respect to the disc. During a positioning operation, when the transducer encounters the index mark of the first sector, it enables a sector counter which indicates when the next index mark should be encountered based upon the speed of the disc rotation. When the transducer encounters the second index mark it is validated against the indication of the sector counter. If the actual index mark read by the transducer coincides with the indication of the sector counter, it is concluded that the sector counter is providing accurate index synchronization. The sector counter is further used to count the sector numbers. Position Identifier contained in the position identifier field provides the subtrack number of the subtrack within the zone.

FIG. 1 shows position identifiers written on a disc media having four zones 1 through 4, with each zone having five subtracks 0 through 4 and each subtrack further having four sectors, according to a prior art system. A unique position identifier 21 is written in each subtrack, so that a specific subtrack in a specific zone can be identified. A sector counter is maintained in the control system to identify each sector in a subtrack. As it can be seen, using the prior art system, there is a need for twenty (number of zones x number of subtracks) unique position identifiers to identify all the subtracks and the zones. Further, the control system needs to maintain the sector count, so that the specific sector on which the head is positioned is determined.

In the prior art systems as described above, there is a need to write a unique index mark bit in the position data field of the first sector. Further, there is a need to write an index mark in every sector. In addition, there is a need to write a unique Position Identifier in Gray Code for every subtrack contained in all the zones. The need to write a physical index mark bit in every first sector can pose problems during the manufacture of the disc drive if the location where the index mark has to be written is defective. In addition, the index mark bit in the first sector may deteriorate or be accidentally overwritten. As the number of tracks and subtracks in a disc drive increase, the number of bits needed to encode a unique position identifier in gray code for every subtrack will increase.

There is a need to eliminate or provide an alternate index mark bit to locate or validate the start of a subtrack and the sector count. There is also a need to provide an improved method of encoding the subtrack number and the zone number so that less number of bits are needed to encode the position identifiers. There is also a need to provide an encoding method whereby redundant information is available for a controller to accurately determine the position of the transducer head viz. sector number, subtrack number and zone number.

SUMMARY OF THE INVENTION

The present invention provides an apparatus and method for encoding position information designed to satisfy the aforementioned needs. The invention provides for encoding position information for zone number, subtrack number and sector number, with less number of bits than prior art systems. The invention also provides for redundant position information to accurately determine the position of the transducer head. The invention further provides for validating the index mark bit in the preferred embodiment and in the alternate embodiment, eliminate the need for an index mark.

The present invention in its broad form relates to an apparatus and method of encoding and decoding position information for Pth zone on a recording medium, the recording medium having a plurality of zones 1 through Q, each zone having a plurality of subtracks 0 through M. Each subtrack further having a plurality of sectors 0 through N. Each sector further having a position identifier field having a plurality of information units for recording a position identifier, the positioner identifier having a value, with Nth position identifier of subtrack M identified as S(M,N). The value of position identifiers S(M,N) and S(M,N−1) for a zone P are chosen such that the difference of the values of S(M,N) and S(M,N−1) for Pth zone are different from the difference of the values of S(M,N) and S(M,N−1) for all other zones, for all values of M and N.

In a specific embodiment of the invention, the value of position identifiers are chosen such that the value of (S(M, N)−S(M,N−1)) is different from the value of (S(M,0)−S(M, N)) for all values of M.

BRIEF DESCRIPTION OF THE DRAWINGS

FIG. 1 shows position identifiers written on a disc media of a prior art system.

FIG. 5 shows position identifiers written on a disc media according to an embodiment of the invention.

FIG. 6 shows position identifiers written on a disc media according to an alternate embodiment of the invention.

DETAILED DESCRIPTION OF THE DRAWINGS

Figure 2:
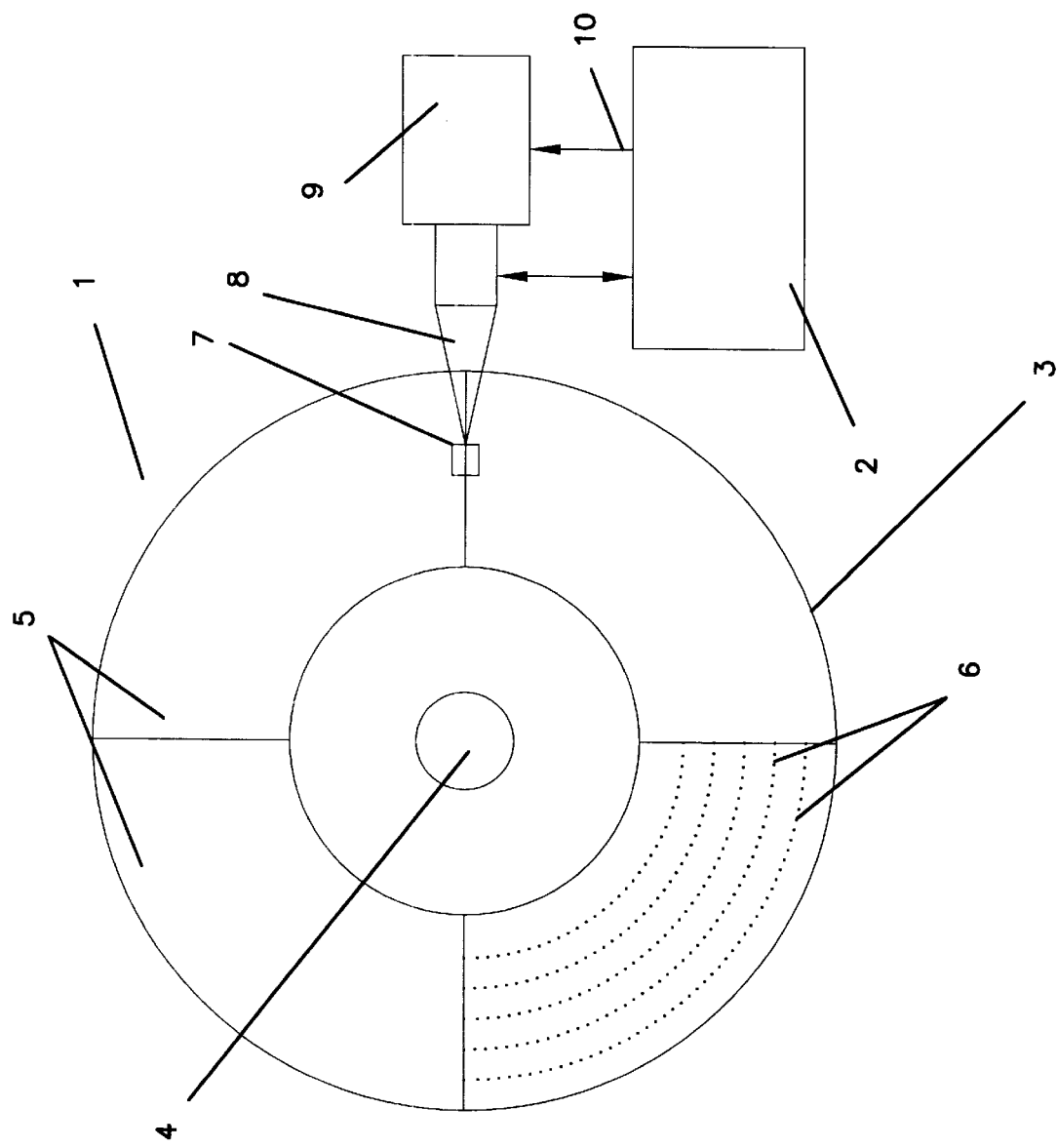
FIG. 2 shows a magnetic disc memory system for use with the disclosed invention, with zone and subtrack layouts on a disc media.

FIG. 2 shows a head-disc assembly subsystem 1 of a magnetic disc memory system with associated control system 2 for use with the invention disclosed here. A disc media 3 is attached to a spindle motor 4, enabling rotation of the disc media 3. The disk media 3 has a plurality of zones 5. Each zone 5 has a plurality of subtracks 6 which are written during a manufacturing process, with each subtrack 6 containing a plurality of sectors, with each sector containing a plurality of information data. A head 7 attached to a head arm assembly 8 is connected to a positioner assembly 9. The information data from the disc media 3 is read by head 7 and fed to the control system 2 after appropriate preamplification. Depending upon a positioning signal 10 received from the servo control system, the positioner assembly 9 moves the head 7 across the disc media 3 to position the head 7 on a subtrack 6 so that information data can be either written on a subtrack 6 or read from a subtrack 6.

Figure 3:
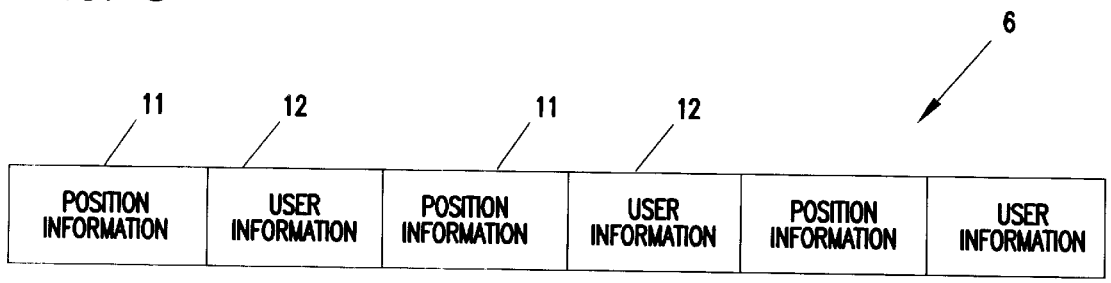
FIG. 3 shows layout of a subtrack on a disc media, with positioner information data portion.

FIG. 3 shows typical layout of a subtrack 6. The information data contained in each sector of a subtrack includes a position information data 11 portion and user information data 12 portion.

Figure 4A:
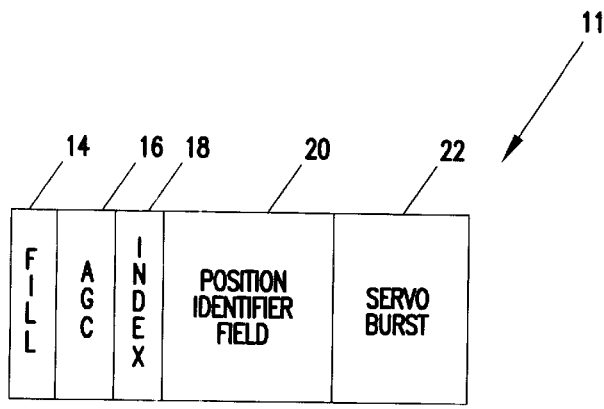
FIG. 4a shows the information component of position information data portions, according to an embodiment of the invention.

FIG. 4a shows typical information component of a position information data 11 portion of a subtrack for use with one embodiment of the invention. These information components are fill 14, AGC 16, index 18, Position Identifier field 20 and servo burst 22. The position identifier field 20 contains a plurality of information units to record a position identifier 21 (not shown) having a value 23 (not shown), which is used to decode the zone number, subtrack number and sector number according to the teachings of the invention. The servo burst 22 information provides the position of the head 7 relative to a track center. The fill 14, AGC 16, index 18 and part of position identifier 20 provide necessary timing and setup information for the servo control system 2 so that servo burst 22 read from the disc media 3 can be appropriately gated into control system 2 circuits.

Figure 4B:
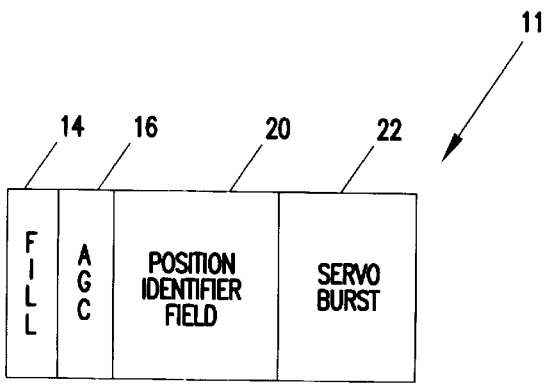
FIG. 4b shows the information component of position information data portions, according to an alternate embodiment of the invention.

FIG. 4b shows typical information component of a position information data 11 portion of a subtrack for use with alternate embodiment of the invention. These information components are fill 14, AGC 16, Position Identifier field 20 and servo burst 22. The position identifier field 20 contains a plurality of information units to record a position identifier 21 (not shown) having a value 23 (not shown), which is used to identify the zone number, subtrack number, the first sector and sector number according to the teachings of the alternate embodiment of the invention. The servo burst 22 information provides the position of the head 7 relative to a track center. The fill 14, AGC 16, index 18 and part of position identifier 20 provide necessary timing and setup information for the servo control system 2 so that servo burst 22 read from the disc media 3 can be appropriately gated into control system 2 circuits.

Now referring to FIG. 2, FIG. 3, FIG. 4a and FIG. 4b, during a positioning operation, the servo burst 22 portion of the position information data 11 read from the disc media 3 is utilized by the control system 2 to determine the position of the head 7 relative to a subtrack 6 and issue appropriate positioning signal 10 to the positioner assembly 9 so that head 7 can be positioned accurately on a subtrack 6.

When an index field is available, as shown in FIG. 4a, according to the first embodiment of the invention, the Index field portion of the position information data 11 read from the first sector is utilized to identify the start of the first sector and locking an oscillator in the control system 2. A sector counter is enabled in the control system 2 which indicates when the next index field will be encountered. Then subsequent index field portion of the position information data 11 is validated against the indication generated by the sector counter to verify index synchronization. Subsequent to index synchronization, timing signals are generated to read various fields of the position information data 11. The sector counter can also be used to keep track of the specific sector on which a head is positioned. Upon encountering the position identifier field, the position identifier 21 encoded in Gray code is read from the disc media 3 and is decoded in the control system 2 according to the teachings of the invention to decode or validate various position related information like subtrack number, zone number and sector number. This will be explained fully, using the FIG. 5.

When an index field is not available, as shown in FIG. 4b, according to an alternate embodiment of the invention, the location of the first sector is determined by decoding the positioner identifiers read from each sector of a subtrack. The control system 2 maintains certain timing information based upon prior positioning operation and generates necessary timing signals so that position identifiers written on a subtrack can be read. Once the position identifiers 21 encoded in Gray code is read from the disc media 3 and is decoded in the control system 2 according to the teachings of the alternate embodiment of the invention, various position related information like subtrack number, zone number and sector number can be determined or validated. This will be explained fully, using the FIG. 6.

FIG. 5 shows position identifiers 21 and their value 23 written on a disc media having four zones 1 through 4, with each zone has five subtracks local to that zone only and numbered 0 through 4, with each local subtrack having five sectors local to that subtrack only and numbered 0 through 4 according to an embodiment of the invention. The FIG. 5 shows the position identifier 21 in Gray Code written in each sector of the subtracks. FIG. 5 further shows the value 23 of each position identifier 21 as well.

FIG. 6 shows position identifiers 21 and their values 23 written on a disc media having four zones 1 through 4, with each zone having five subtracks local to that zone only and numbered 0 through 4, with each local subtrack having four sectors local to that subtrack only and numbered 0 through 3 according to an alternate embodiment of the invention. The FIG. 6 also shows a skipped value 25 for each of the subtracks. The FIG. 6 shows the position identifier 21 in Gray Code written in each sector of the subtracks. FIG. 6 further shows the value 23 of each position identifier 21 as well.

The embodiment shown in FIG. 5 encodes position information for five sectors, for use with a subtrack as shown in FIG. 4a, with an index field, whereas, the embodiment shown in FIG. 6 encodes position information for four sectors and can be used with a subtrack as shown in FIG. 4b. Initially, the common inventive features of both embodiments shown in FIG. 5 and FIG. 6 will be described. Later the variations between the inventive features of both embodiments will be explained.

Now, the common inventive features of embodiments shown in FIG. 5 and FIG. 6, will be explained. With reference to both FIG. 5 and FIG. 6, for convenience, in a given zone P, let us identify position identifier in Nth sector of subtrack M as S(M,N). Thus, for example, in Zone 2, the value of position identifier S(4,1) is 1 and the value of position identifier S(4,2) is 3.

According to the teachings of both embodiments of the invention shown in FIG. 5 and FIG. 6, the method of encoding the position information for Pth zone comprises the steps of choosing the values of position identifiers S(M,N) and S(M,N−1) for Zone P such that the a) difference of the values of S(M,N)−S(M,N−1) is equal to P if S(M,N)−S(M,N−1) is greater than 0 else ((Q+1)+S(M,N)−S(M,N−1)) is equal to P (hereinafter referenced as "First Constraint"; and b) the value of S(M,0) is the remainder part of the quotient M/(Q+1) (hereinafter referenced as "Second Constraint").

For example, let us consider Zone 2, Subtrack 1 and sectors 0 and 1. The value of S(1,1) is 3 and the value of S(1,0) is 1. Since the value of S(1,1) is greater than S(1,0), subtracting the value of S(1,0) from S(1,1) yields 2 which is the zone number. Further, the value of S(1,0) is 1 which is the remainder part of the quotient M/(Q+1) where M is equal to 1 and Q, the number of zones is equal to 4.

As another example, let us consider Zone 2, Subtrack 1 and sectors 1 and 2. The value of S(1,2) is 0 and the value of S(1,1) is 3. Since the value of S(1,2) is less than S(1,1) according to the teachings of this invention, ((Q+1)+S(1,2)−S(1,1)) which is ((4+1)+0−3) resulting in 2, the zone number.

Now, the variations between the two embodiments shown in FIG. 5 and FIG. 6 will be explained. In the above examples, Q+1 is equal to 5, a prime number. This yields (Q+1−1) (i.e. 4) series of numbers with each series having (Q+1) values, where each of the series can be used to encode a specific zone, meeting the First Constraint of the common inventive teachings of both embodiments as explained previously. The series are (0,1,2,3,4), (0,2,4,1,3), (0,3,1,4,2) and (0,4,3,2,1). Further, each of the series can provide five subseries wherein the first value in the subseries is different. For example, the series (0,1,2,3,4) can yield five subseries (0,1,2,3,4), (1,2,3,4,0), (2,3,4,0,1), (3,4,0,1,2) and (4,0,1,2, 3). The first value in each subseries can be used to identify a subtrack, yielding encoding of five subtracks as specified in the Second constraint. When these values are encoded as position identifiers, there is a need to determine the first sector so that the value of the position identifier can be used to determine the subtrack number. This can be accomplished in two alternate ways, leading to the variations between the two embodiments shown in FIG. 5 and FIG. 6.

First embodiment of the invention as shown in FIG. 5 involves the use of traditional sensing of physical index mark so that the first sector can be identified independent of the value of the position identifiers and subsequently decoding the value of position identifier in first sector as the subtrack number. Thus, for a prime number K, according to first embodiment of the invention, we can encode (K−1) zones, with each zone having K subtracks and each subtrack having K sectors. For example, if we use prime number 127, which can be encoded using 7 bits, according to the teachings of this embodiment of the invention, we can encode up to 126 zones, with each zone having 127 subtracks and with each subtrack having 127 sectors. Similarly, if we use prime number 61, which can be encoded using 6 bits, according to the teachings of this invention, we can encode up to 60 zones, with each zone having 61 subtracks and with each subtrack having 61 sectors.

Once the recording medium is encoded according to the first embodiment of the invention as shown in FIG. 5, the physical index mark is used to determine the start of a subtrack and thus the first sector encountered by the transducer. The value of position identifier encoded in the first sector identifies the subtrack.

According to alternate embodiment of the invention as shown in FIG. 6, the last value in each of the subseries is skipped during encoding. This enables the control system to detect the skipped value when values of the position identifiers encoded in first sector and last sector in a subtrack are read and compared. Thus, for example, according to the alternate embodiment of the invention, for prime number K, we can encode (K−1) zones, with each zone having K subtracks and each subtrack having (K−1) sectors. For example, if we use prime number 127, which can be encoded using 7 bits, according to the teachings of this invention, we can encode up to 126 zones, with each zone having 127 subtracks and with each subtrack having 126 sectors. Similarly, if we use prime number 61, which can be encoded using 6 bits, according to the teachings of this invention, we can encode up to 60 zones, with each zone having 61 subtracks and with each subtrack having 60 sectors.

Once the recording medium is encoded according to the alternate embodiment of the invention as shown in FIG. 6, the location of first sector can be determined by a transducer by detecting the break in the sequence of values of position identifiers between sectors S(M,3) and S(M,0). For example, the values of position identifiers for zone 2 having four sectors can be four out of the five possible values 0, 2, 4, 1 and 3. Let us call the fifth value that is not used to encode a sector in a subtrack as a skipped value. Once the value of S(M,0) is fixed according to the teachings of this invention and rest of the three sectors are encoded in sequence accordingly, there will always be a break in the sequence of values between S(M,3) and S(M,0). Thus, by comparing the values of adjacent position identifiers, break in the sequence of values can be detected. The break in the sequence of values of position identifiers also leads to the identification of the first sector. This method of identifying the first sector can be used independently as a virtual index for start of a sector. The virtual index as identified could also be used in conjunction with recording medium having a physical index mark for validation or to provide redundancy. Ability to encode and decode a virtual index mark as described above provides a means to shift the start of a subtrack to any other location so as to avoid any media defects or to improve timing considerations.

Zone, Subtrack and Sector Decoding

Once the recording medium is encoded according to the teachings of this invention as described in FIG. 5 and FIG.

6, decoding of position information can be accomplished in various ways depending upon the information that is already available in the control system. For example, a) By identifying the first sector either according to the first embodiment of the invention as described in FIG. 5 or according to the alternate embodiment of the invention as described in FIG. 6, we can determine the value of S(M,0). The value of S(M,0) gives the subtrack number.

b) By determining the value of two adjacent position identifiers S(M,N) and S(M,N−1), we can determine the zone number by subtracting the value of S(M,N−1) from S(M,N) if the value of S(M,N) is greater than the value of S(M,N−1) else by subtracting the value of S(M,N−1) from the value of S(M,N) and adding (Q+1).

c) By knowing the value of S(M,0) and the zone number, the sector number can be determined. Knowing the zone number will identify a specific series of values that was used to encode the zone. Knowing the value of S(M,0) identifies the sequence of values in the subseries used to encode various sectors within a specific subtrack M. Thus by comparing the value of the position identifier read from the recording medium to the known sequence of values of the specific subseries used to encode the subtrack, we can determine the sector number.

Even though the above description discloses a method of decoding the position information, during a positioning operation, the control system may already have certain positioning information retained from a previous positioning operation. For example, the control system may already know the subtrack that the transducer is currently positioned and with a synchronized system oscillator providing necessary timing clock, can predict the value of position identifier that it should encounter during a positioning operation. In such a system, the disclosed invention provides a redundant mechanism to validate the actual position information retrieved from the position identifiers encoded on the recording medium to the expected value of the position identifiers calculated by the control system, thereby improving the reliability of a positioning operation.

As another example, the control system may already know the zone number P and the expected sector number N that the transducer is currently positioned. Then, the value of the position identifier S(M,N) is read. Knowing the zone number P, the sector number N and the value of the position identifier S(M,N), the specific subseries corresponding to the subtrack M can be identified. The value of S(M,0) of the identified subseries gives the subtrack number.

Thus, due to prior positioning operations, it is possible for the control system to already know one or more positioning information data like expected sector number, expected zone number and expected track number. By combining the known position information in the control system with the value of the position identifiers read from the media, a robust positioning system with redundant information can be realized by using the teachings of this invention. The decoding methods disclosed by the inventor is not exhaustive and once the recording medium is encoded according to the teachings of this invention, one skilled in the art can come up with various other methods to decode the zone number, subtrack number and the sector number essentially by combining the known position information data in the control system with the information contained in the position identifiers. The position identifiers in the above description of preferred embodiments can be any identifiable signal, word or bit stream which can be assigned a value and represent a known linear or non-linear series. Even though the examples show encoding position information for four zones, with each zone having five subtracks and each subtrack having four sectors, one skilled in the art would readily appreciate the applicability of the disclosed invention to a different combination of zones, subtracks and sectors.

From the above description, it is apparent that many modifications and variations of the present invention are possible in light of the above teachings. It is therefore to be understood that, within the scope of the appended claims, the invention may be practiced otherwise than as specifically described hereinabove.

I claim:

1. A method of identifying a target location within a zone P on a recording medium having a plurality of zones each having a plurality of subtracks each having a plurality of sectors each having a position identifier field containing a position identifier value S(I,J), I being a local subtrack number within zone P, J being a local sector number within subtrack I, the method comprising steps of:

(a) determining a value of $S(I,J_o)$ where $J_o$ is a predetermined local sector number; and (b) identifying the target location's subtrack by assigning the value $S(I,J_o)$ determined in step (a) to the local subtrack number I corresponding to the target location.

2. The method of claim 1, further comprising a step of:

(c) defining S(I,J) such that S(I,J)−S(I,J−1)≠S(I,0)−S(I,J) for all valid values of I.

3. The method of claim 1, further comprising a step of:

(c) defining S(I,J) such that S(I,J)−S(I,J−1) for zone P has a value different from S(I,J)−S(I,J−1) for all other zones, for all valid combinations of I and J.

4. The method of claim 1 in which determining step (a) is performed with $J_o$=0, further comprising a prior step of defining S(I,0)=for all values of I from 0 through M.

5. A method of identifying a target location within a zone P on a recording medium having a plurality of zones 1 through Q each having a plurality of subtracks 0 through M each having a plurality of sectors 0 through N each having a position identifier field containing a position identifier value S(I,J), I being a local subtrack number within zone P, J being a local sector number within subtrack I, the method comprising steps of:

(a) defining S(I,0)=I for 0≦I≦M;

(b) defining S(I,J) such that, for 0≦I≦M and 1≦J≦N, (i) S(I,J)−S(I,J−1) for zone P has a value different from S(I,J)−S(I,J−1) for all other zones, (ii) if S(I,J)>S(I,J−1) then S(I,J)−S(I,J−1)=P else Q+1+S(I,J)−S(I,J−1)=P, and (iii) S(I,J)<Q+1;

(c) determining a value of S(I,J) with J=0; and (d) identifying the target location's subtrack by assigning the value S(I,J) determined in step (c) to the local subtrack number I corresponding to the target location.

* * * * *